United States Patent
Mack

(10) Patent No.: US 7,613,430 B1
(45) Date of Patent: Nov. 3, 2009

(54) DUAL SYNTHESIZER RF FREQUENCY PLAN OPTIMIZED FOR INTERFERENCE AVOIDANCE

(75) Inventor: Michael P. Mack, Santa Clara, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 559 days.

(21) Appl. No.: 11/317,876

(22) Filed: Dec. 22, 2005

(51) Int. Cl.
*H04B 1/40* (2006.01)
*H04B 1/18* (2006.01)

(52) U.S. Cl. .................. 455/76; 455/165.1; 455/183.1

(58) Field of Classification Search ............. 455/76, 455/165.1, 183.1, 182.1, 260, 278.1, 63.1, 455/114.2, 296
See application file for complete search history.

(56) References Cited

U.S. PATENT DOCUMENTS

| | | | |
|---|---|---|---|
| 5,963,852 A * | 10/1999 | Schlang et al. ............... 455/76 |
| 6,351,502 B1 | 2/2002 | Zargari | |
| 6,567,654 B1 * | 5/2003 | Coronel Arredondo et al. .......... 455/315 |
| 6,968,173 B2 * | 11/2005 | Cowley ..................... 455/323 |
| 6,990,154 B1 * | 1/2006 | Bellaouar .................. 375/295 |
| 7,076,226 B2 * | 7/2006 | Bult et al. ................. 455/252.1 |
| 2005/0089119 A1 * | 4/2005 | Miyagi ..................... 375/316 |
| 2005/0160475 A1 * | 7/2005 | Waight et al. ............... 725/151 |
| 2005/0260961 A1 * | 11/2005 | Cowley et al. ............. 455/191.1 |

* cited by examiner

*Primary Examiner*—Sonny Trinh
(74) *Attorney, Agent, or Firm*—Bever, Hoffman & Harms, LLP; Jeanette S. Harms

(57) ABSTRACT

Using separate synthesizers in a radio frequency (RF) device can facilitate avoiding interference. Specifically, a first synthesizer can be programmed to generate a first output frequency signal having an Frf frequency. A second synthesizer can be programmed to generate a second output frequency signal having an Fif frequency. Notably, a sum of the Frf and Fif frequencies equals an Fchannel frequency of the RF device. Thus, any RF channel can be received (or transmitted) with a plurality of VCO frequencies for each of the two synthesizers. A table of Frf/Fif combinations can be used to determine an Frf/Fif combination that avoids a known interfering source. Alternatively, Frf/Fif combinations can be randomly chosen until an interfering source is avoided.

12 Claims, 5 Drawing Sheets

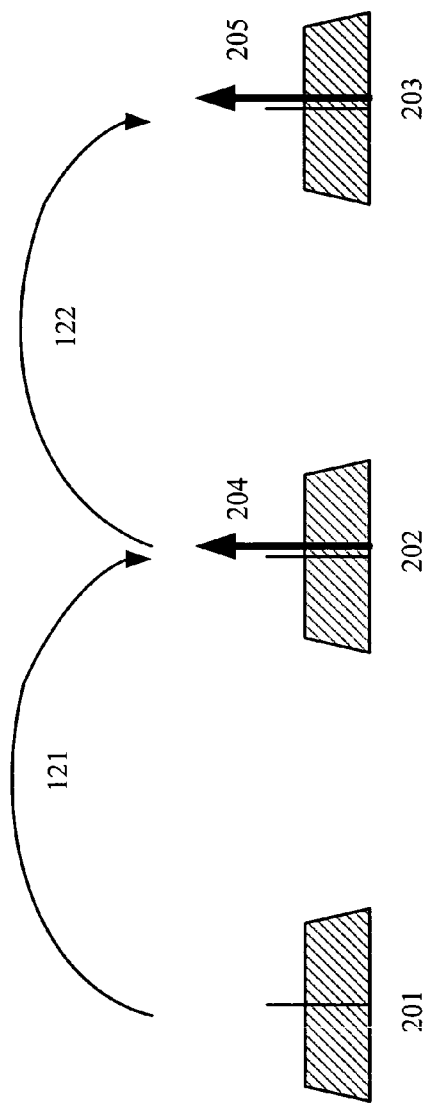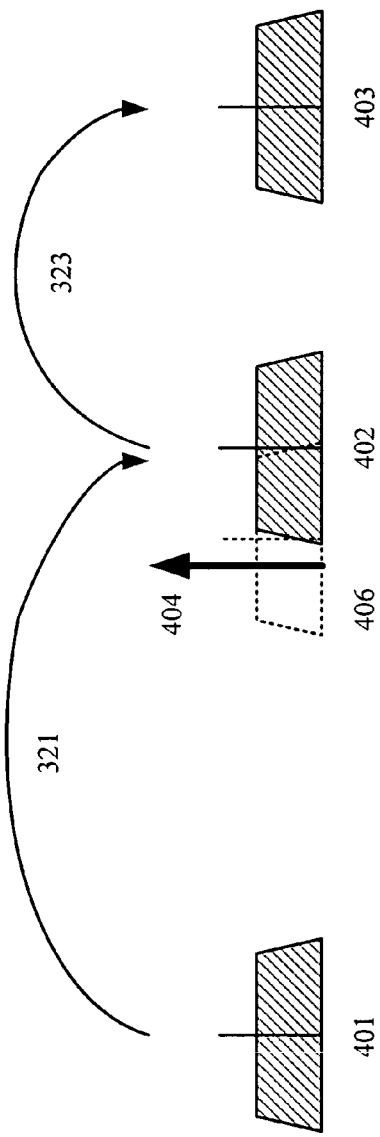

DUAL SYNTHESIZER RF FREQUENCY PLAN OPTIMIZED FOR INTERFERENCE AVOIDANCE

BACKGROUND OF THE INVENTION

1. Field of the Invention

The present invention relates to using two synthesizers for generating the RF and the IF oscillators in a radio, thereby making transceivers more robust with respect to interference.

2. Related Art

A transceiver includes both a receiver for receiving radio frequency (RF) signals and a transmitter for transmitting RF signals. The front-end of a receiver and the back-end of a transmitter can include similar components, such as a synthesizer for generating two output frequency signals. A brief overview of these components is described in FIG. 1, which illustrates a simplified receiver 100.

In receiver 100, a bandpass filter 102 receives the incoming signals from an antenna 101 and outputs a predetermined band of frequencies (while excluding those frequencies higher and lower than the predetermined band). A variable RF amplifier 103 can provide an initial amplification to that predetermined band of frequencies. A mixer 104 and IF filter 105 convert those amplified signals into intermediate frequency (IF) signals, which are then amplified by an IF amplifier 106.

At this point, mixers 107 and baseband filters 108 (including both I and Q branches) can generate signals in the desired channel, which are called the baseband signals. Baseband amplifiers 109 then amplify these baseband signals. Analog to digital converters (ADCs) 110 (provided for both the I and Q branches of baseband filters 108) transform the amplified baseband signals into digital signals that can be analyzed by a processing block 111.

In receiver 100, one synthesizer 120 generates two output frequency signals 121 and 122. Synthesizer 120 typically generates output frequency signal 122 by dividing output frequency signal 121 by two using a quadrature divider. U.S. Pat. No. 6,351,502, which issued on Feb. 26, 2002 to Atheros Communications, Inc., describes this process and is incorporated by reference herein. Mixer 104 receives output frequency signal 121. This signal has a frequency Frf, which could be greater or less than the frequency of the signal Fx1 output by RF amplifier 103. Mixer 104 mixes the signals having frequencies Fx1 and Frf and generates an output signal having two components. The first component, also called the intermediate component, is at a frequency Fx1-Frf (or Frf-Fx1, if Frf is greater than Fx1) (note that depending on the configuration, mixer 104 could be associated with the upper sideband such that frequency Fif (provided by mixer 107) is greater than frequency Frf). The second component is at a frequency Fx1+Frf. IF filter 105 receives this output signal and attenuates the second component at frequency Fx1+Frf, thereby leaving the intermediate component Fx1−Frf=Fx2. IF amplifier 106 amplifies the resulting signal having the intermediate component. In some embodiments, mixer 104 may be an image reject mixer, which may reduce the required performance of, or remove the need for, IF filter 105.

Mixers 107 receive output frequency signal 122, which has a frequency Fif. Therefore, mixers 107 generate output signals having two components. The first component is at a frequency Fx2-Fif. Generally, because Fx2 is substantially equal to Fif, the first component is called a baseband component whose frequency is substantially equal to 0. The second component is at a frequency Fx2+Fif (e.g. 2*Fif). Baseband filters 108 receive these output signals and attenuate the second component, thereby leaving the baseband component at a frequency of 0. Baseband amplifiers 109 amplify the resulting signals with the baseband component, thereby generating an output signal having a frequency Fbb (e.g. 0).

In the above-described frequency technique (also called a sliding IF), each RF channel has one corresponding voltage controlled oscillator (VCO) frequency and one intermediate frequency (IF). Typically, a design for receiver 100 would specify a fixed IF frequency and then adjust the RF frequency (i.e. by adjusting output frequency signal 121) so that irrespective of the current channel the desired IF frequency is output by output frequency signal 122.

Unfortunately, in receiver 100, interfering sources (e.g. fixed frequency clock waveforms) and noise (e.g. sidebands associated with a narrowband signals, called "birdies") can couple into the RF frequency or the IF frequency. For example, FIG. 2 illustrates an RF passband 201, an IF passband 202, and a desired baseband (BB) passband 203. A signal in RF passband 201 is converted to a signal in IF passband 202 using a first output frequency signal (e.g. output frequency signal 121 of FIG. 1). Similarly, a signal in IF passband 202 can be converted to a signal in BB passband 203 using a second output frequency signal (e.g. output frequency signal 122).

As shown in FIG. 2, a large interfering source, called a "blocker" 204, can be present in IF passband 202. Unfortunately, blocker 204 cannot be filtered out because of its position relative to IF passband 202. That is, a blocker in or near IF passband 202 may be difficult or even impossible to filter without affecting the IF signal. Therefore, a mixer receiving an IF signal, blocker 204, and the signal from the second output frequency signal would undesirably generate another blocker, i.e. blocker 205, within baseband passband 203. This blocker propagation can significantly degrade receiver sensitivity and/or blocking performance. Note that in a transmitter a similar interfering source would cause a transmit spur.

Therefore, a need arises for a system and a technique that can advantageously avoid interference.

BRIEF DESCRIPTION OF THE FIGURES

FIG. 2 illustrates how a blocker present in the IF passband can be undesirably propagated to the baseband passband.

FIG. 4 illustrates how adjusting one or both of the output frequency signals can advantageously avoid interfering sources.

SUMMARY OF THE INVENTION

Figure 1:
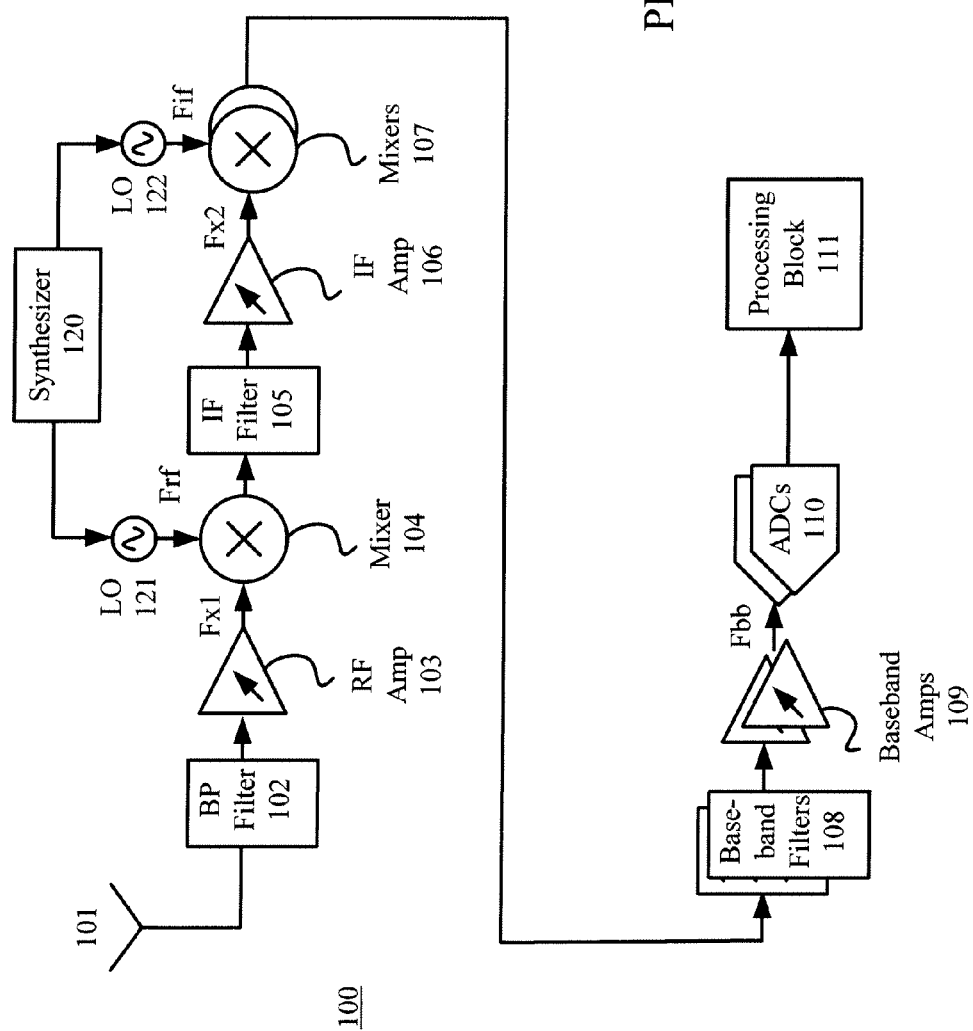
FIG. 1 illustrates a conventional receiver that uses a single synthesizer to generate two output frequency signals.

In accordance with one feature of the invention, separate synthesizers in a radio frequency (RF) device, e.g. a receiver, transmitter, or transceiver, can generate the RF frequency (Frf) and the intermediate frequency (Fif). For example, a first synthesizer can be programmed to generate a first output frequency signal having the Frf frequency, whereas a second synthesizer can be programmed to generate a second output frequency signal having the Fif frequency. Notably, a sum of the Frf and Fif frequencies equals a channel frequency of the RF device.

Thus, any RF channel can be received (or transmitted) with a plurality of VCO frequencies for each of the two synthesizers. In one embodiment, a table (e.g. a lookup table) of Frf/Fif combinations can be advantageously used to select an Frf/Fif combination that avoids a known interfering source. Alternatively, in another embodiment, Frf/Fif combinations can be randomly chosen until an interfering source is avoided. Note that an interfering source may be at an IF frequency or at an RF frequency. For example, a blocker could be internally generated at numerous locations along the receiver/transmitter chain from an antenna to the IF mixers. The use of separate programmable synthesizers can advantageously avoid any such blocker.

In addition to avoiding an interfering source, using separate synthesizers can provide other system advantages. For example, two synthesizers can allow each synthesizer to perform its tuning function in a slightly different way. That is, one synthesizer could tune over a large range, but with coarse channels. The other synthesizer could tune over a significantly smaller range with fine channels. Therefore, the design of each synthesizer could be simplified, thereby minimizing any significant increase in area or power performance associated with providing two synthesizers. In one embodiment, such coarse/fine synthesizers can also be mixed together to create a single-frequency mixing signal source suitable for use in a single-stage input signal mixing stage (e.g., a direct conversion system). Moreover, because a local oscillator in a synthesizer may have its own phase noise, by using two separate synthesizers, the phase noise of each local oscillator is uncorrelated, thereby advantageously producing system phase noise that sums in an RMS manner as opposed to correlated sources, which produces phase noise that sums in a peak-to-peak manner.

DETAILED DESCRIPTION OF THE FIGURES

One type of a conventional receiver or transmitter uses a single synthesizer and a fixed frequency oscillator to generate two output frequency signals: an intermediate frequency (IF) output frequency signal and a radio frequency (RF) output frequency signal. Another type of conventional process uses a single synthesizer that produces a single output frequency signal, which in turn is then processed to generate a related, second output frequency signal (e.g. the "sliding IF" system described previously). Unfortunately, in either of the above-described schemes, only one combination of RF and IF frequencies can be selected to convert an incoming signal.

An interfering source occurring in or very near the RF or IF passband cannot be avoided by adjusting the synthesizer. Because such an interfering source cannot be avoided without affecting a desired signal in the passband, the mixer receiving the desired signal, the signal from the output frequency signal, and the interfering source can undesirably propagate that interfering source downstream.

Figure 3:
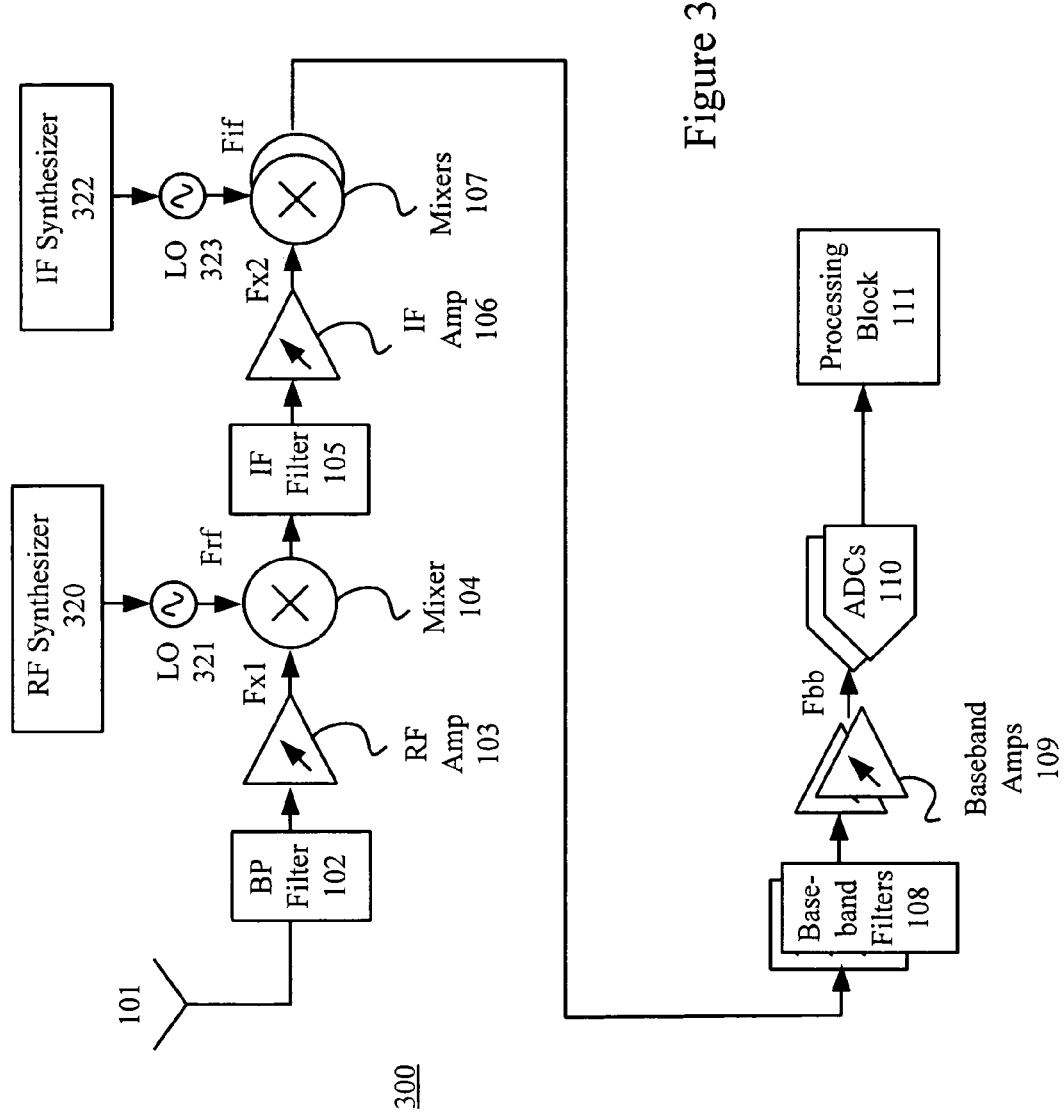
FIG. 3 illustrates a receiver that uses two synthesizers to generate two adjustable output frequency signals.

In accordance with one aspect of the invention, both an RF synthesizer and an IF synthesizer can be provided in a receiver/transmitter. For example, FIG. 3 illustrates a receiver 300 including an RF synthesizer 320 that generates output frequency signal 321 (Frf) and an IF synthesizer 322 that generates output frequency signal 323 (Fif). In this configuration, Fchannel=Frf+Fif.

Synthesizers 320 and 322 can be designed so that each Rf channel is received with at least two distinct VCO frequencies for each of the two synthesizers. For example, the channel 2.4 GHz could be obtained by programming Frf to 1.4 GHz and Fif to 1 GHz. Alternatively, the same channel could be obtained by programming Frf to 1.42 GHz and Fif to 980 MHz. Thus, providing separate RF and IF synthesizers 320 and 322 can advantageously result in a dynamic redundant IF.

This dynamic redundant IF facilitates interference avoidance. Specifically, the interfering sources in the receiver (and spur sources in the transmitter) can be mitigated by moving the IF frequency without changing the desired channel. For example, FIG. 4 illustrates an RF passband 401, a first IF passband 402, a second IF passband 406, and a desired baseband (BB) passband 403. A signal in RF passband 401 can be converted to a signal in first IF passband 402 (or second IF passband 406) using a first synthesizer (e.g. producing output frequency signal 321 of FIG. 3). Similarly, a signal in first IF passband 402 (or second IF passband 406) can be converted to a signal in BB passband 403 using a second synthesizer (e.g. producing output frequency signal 323).

As shown in FIG. 4, a large interfering source, e.g. a blocker 404, can be present in IF passband 406. However, because the Frf and Fif frequencies can be dynamically adjusted, IF passband 402 can be used instead of IF passband 406. Advantageously, the use of IF passband 402 can avoid blocker 404. Specifically, by using IF passband 402, mixers 107 in receiver 300 (FIG. 3) would not receive blocker 404, thereby increasing receiver sensitivity. Moreover, because blocker 404 is not in IF passband 402, blocker 404 can be filtered out, thereby improving blocker performance. Thus, avoiding interfering sources by using two separate synthesizers can provide significant system advantages.

Figure 5B:
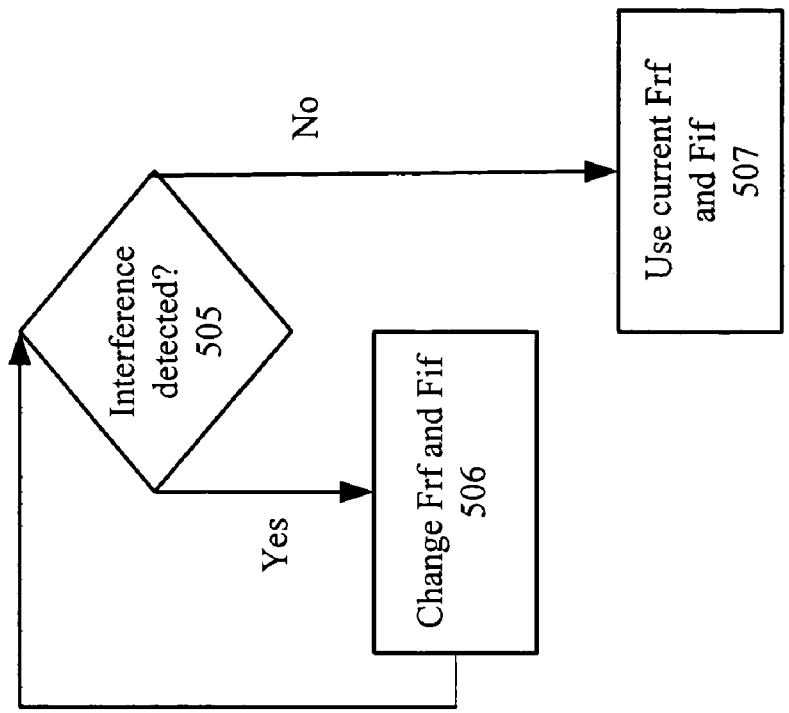
FIG. 5B illustrates another technique for changing the Frf and Fif frequencies.
Figure 5A:
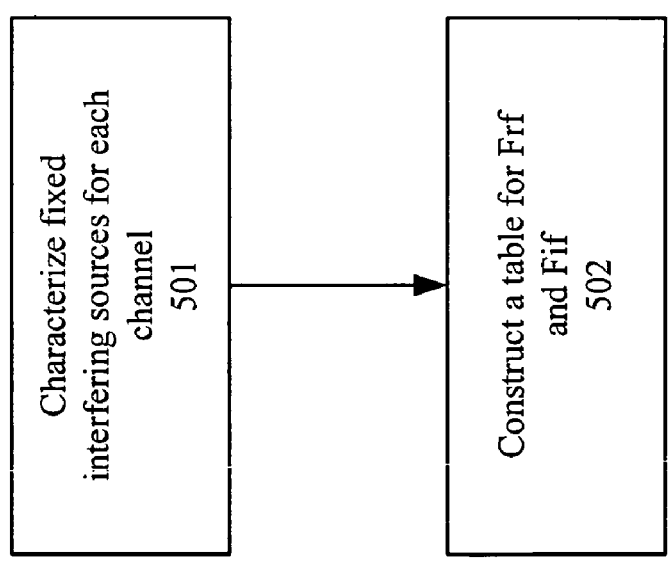
FIG. 5A illustrates one technique for changing the Frf and Fif frequencies.

In one embodiment shown in FIG. 5A, moving the Frf and Fif frequencies could be done by characterizing fixed sources of interference/spurs for each channel (e.g. using an algorithm that measures signal to noise ratio (SNR) at the baseband) in step 501 and then constructing a table of Frf and Fif that avoids these interfering sources in step 502. In one embodiment, the IF passband can be selected based on the best SNR, as indicated in the table. Alternatively, in another embodiment shown in FIG. 5B, after detecting interference in step 505, the Frf and Fif frequencies can be changed (e.g. randomly switching between available IF passbands) in step 506 until the interference is minimized. At this point, the current Frf and Fif frequencies can be used in step 507.

Each synthesizer 320/322 (FIG. 3) can include standard components such as a VCO, a charge pump, a phase comparator, and dividers. Note that the use of a single synthesizer, e.g. synthesizer 120 (FIG. 1), to generate two output frequency signals means that synthesizer 120 must produce for both frequencies the finest frequency stop tuning over a full channel range. In contrast, by using two synthesizers that can dynamically generate two output frequency signals, each synthesizer can perform its tuning function in a slightly different way. For example, one synthesizer could tune over a large range, but with coarse steps. The other synthesizer could tune over a significantly smaller range with fine steps. Therefore, the design of each synthesizer could be simplified, thereby minimizing any significant increase in area or power performance associated with providing two wide-range, finely stepped synthesizers.

Note that a local oscillator may have its own phase noise. Thus, in the case of a single synthesizer, dividing the signal and then mixing can result in additional phase noise, e.g. an increase on the order of 6 dB. In contrast, by using two separate synthesizers the phase noise of each output frequency signal is uncorrelated, thereby effectively providing approximately 3 dB of margin in the receiver/transmitter/transceiver design.

Although illustrative embodiments of the invention have been described in detail herein with reference to the accompanying figures, it is to be understood that the invention is not limited to those precise embodiments. They are not intended to be exhaustive or to limit the invention to the precise forms disclosed.

Note that a source of interference may be at an IF frequency or at an RF frequency. For example, referring to FIG. 3, a blocker could be internally generated and coupled anywhere along the receiver chain from antenna 101 to mixers 107. The use of separate programmable synthesizers, i.e. RF synthesizer 320 and IF synthesizer 322, can advantageously avoid any such blockers.

Figure 6:
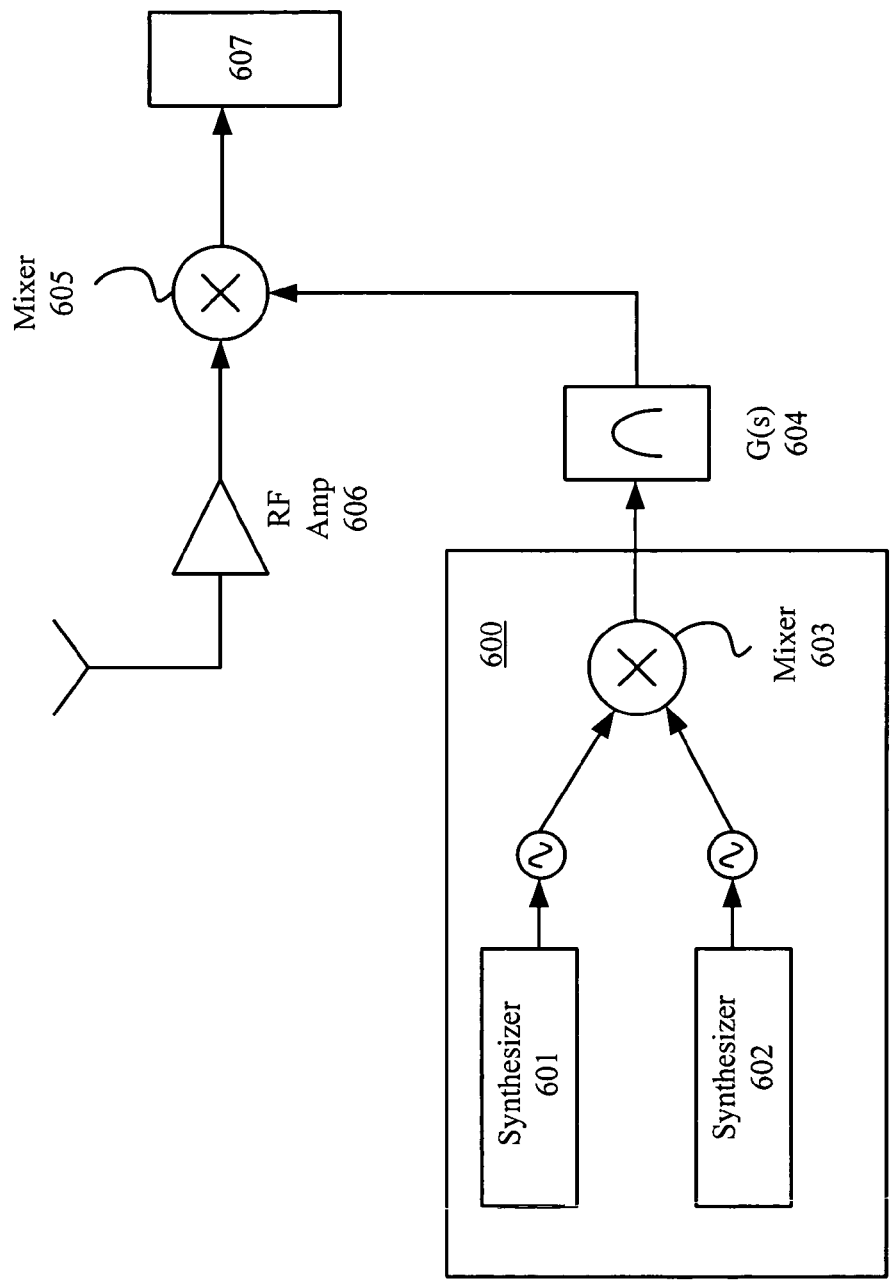
FIG. 6 illustrates a system in which the outputs of a coarse synthesizer and a fine synthesizer can be mixed together using a mixer to create a single-frequency mixing signal source suitable for use in a single-stage input signal mixing stage.

In one embodiment shown in FIG. 6, the outputs of a coarse synthesizer 601 and a fine synthesizer 602 can be mixed together using a mixer 603 to create a single-frequency mixing signal source 600 suitable for use in a single-stage input signal mixing stage (e.g. a direct conversion system (compared to a dual conversion system shown in FIG. 3)). Specifically, synthesizers 601 and 602 can generate output frequency signals $a_1 \cos w_1 t$ and $a_2 \cos w_2 t$, respectively. Mixer 603, which mixes those two frequencies, can provide its output to a bandpass filter G(s) 604 (its function being expressed as G(s) [$a_3 \cos(w_1 t + w_2 t) + a_3 \cos(w_1 t - w_2 t)$]). A mixer 605 can then mix the output of bandpass filter G(s) 604 (e.g. $w_1 + w_2$) and a received signal that was amplified by an RF amplifier 606. The signal generated by mixer 605 can then be provided to other downstream circuitry 607.

Note that as described herein, an interfering signal could be at one of the VCO frequencies, which are not necessarily the same as the RF or the IF frequencies.

Because many modifications and variations will be apparent, it is intended that the scope of the invention be defined by the following Claims and their equivalents.

The invention claimed is:

1. A radio frequency (RF) device comprising:
   a first synthesizer for generating a first output frequency signal having a first frequency; and
   a second synthesizer for generating a second output frequency signal having a second frequency,
   wherein the first and second frequencies are selected by programming the first and second synthesizers to avoid an arbitrary signal, the arbitrary signal being an interfering signal unrelated to a component of the RF device, and wherein a sum of the first and second frequencies equals a channel frequency of the RF device.

2. The RF device of claim 1, further including:
   a first mixer for receiving an output of the first synthesizer and an input signal; and
   a second mixer for receiving an output of the second synthesizer and a signal based on the output of the first mixer.

3. A radio frequency (RF) device comprising:
   a first programmable synthesizer for generating a first output frequency signal having an Frf frequency; and
   a second programmable synthesizer for generating a second output frequency signal having an Fif frequency,
   wherein a sum of the Frf and Fif frequencies equals an Fchannel frequency of the RF device, and wherein the Frf and Fif frequencies avoid an interfering signal unrelated to a component of the RF device.

4. The RF device of claim 3, further including a table including Frf/Fif combinations.

5. The RF device of claim 4, wherein at least one Frf/Fif combination avoids a known interfering source.

6. The RF device of claim 3, wherein Frf/Fif combinations are randomly chosen during operation of the RF device until an interfering source is avoided.

7. A method of improving interference avoidance in a radio frequency (RF) device, the method comprising:
   programming a first synthesizer to generating a first output frequency signal having an Frf frequency; and
   programming a second synthesizer for generating a second output frequency signal having an Fif frequency,
   wherein a sum of the Frf and Fif frequencies equals an Fchannel frequency of the RF device, and wherein the Frf and Fif frequencies avoid an interfering signal unrelated to a component of the RF device.

8. The method of claim 7, further including using a table of Frf/Fif combinations to determine the Frf frequency and the Fif frequency.

9. The method of claim 8, further including using an Frf/Fif combination such that an interfering source is avoided.

10. The method of claim 7, further including randomly choosing an Frf/Fif combination until an interfering source is avoided.

11. A method of improving interference avoidance in a radio frequency (RF) device, the method comprising:
    programming two synthesizers in the RF device to provide a plurality of selectable intermediate frequencies for every RF channel frequency; and
    randomly choosing the intermediate frequency until an interfering source is avoided,
    wherein a sum of selected intermediate frequencies equals an Fchannel frequency of the RF device.

12. A radio frequency (RF) device comprising:
    a first synthesizer for generating a first output frequency signal having a first frequency;
    a second synthesizer for generating a second output frequency signal having a second frequency;
    a first mixer for receiving an output of the first synthesizer and an output of the second synthesizer; and
    a second mixer for receiving an input signal and an output based on the output of the first mixer,
    wherein the first and second frequencies can be selected by programming the first and second synthesizers, wherein the first and second frequencies avoid an interfering signal unrelated to a component of the RF device, and wherein a sum of the first and second frequencies equals a channel frequency of the RF device.

* * * * *